United States Patent [19]

Thompson et al.

[11] Patent Number: 5,104,532
[45] Date of Patent: Apr. 14, 1992

[54] FLAT STACK PERMEATOR

[75] Inventors: John A. Thompson, Lady Smith; Manual E. Camano, Camlachie, both of Canada

[73] Assignee: Exxon Research and Engineering Company, Florham Park, N.J.

[21] Appl. No.: 528,311

[22] Filed: May 24, 1990

Related U.S. Application Data

[63] Continuation-in-part of Ser. No. 407,992, Sep. 15, 1989, abandoned.

[51] Int. Cl.⁵ .......................................... B01D 63/08
[52] U.S. Cl. ............................... 210/224; 210/321.75; 210/321.84
[58] Field of Search ................. 55/16, 158; 210/321.6, 210/321.61, 321.64, 321.72, 321.75, 321.76, 321.84, 321.85, 224, 227, 228-231

[56] References Cited

U.S. PATENT DOCUMENTS

| | | | |
|---|---|---|---|
| T867,005 | 10/1969 | Ulmschneider et al. | 210/321 |
| 3,367,504 | 2/1968 | Westmoreland | 210/321 |
| 3,397,790 | 8/1968 | Newby et al. | 210/321 |
| 3,398,091 | 8/1968 | Greatorex | 210/23 |
| 3,417,870 | 12/1968 | Bray | 210/321 |
| 3,520,803 | 7/1970 | Iaconelli | 210/23 |
| 3,522,885 | 8/1970 | Lavender et al. | 210/321 |
| 3,565,258 | 2/1971 | Lavender et al. | 210/321 |
| 3,701,431 | 10/1972 | Brown et al. | 210/321 |
| 3,705,652 | 12/1972 | Russmann et al. | 210/321 |
| 3,768,660 | 10/1973 | Block | 210/321 |
| 3,786,925 | 1/1974 | Block et al. | 210/321 |
| 3,788,482 | 1/1974 | Markley | 210/321 |
| 3,834,544 | 9/1974 | Tyson et al. | 210/321.75 |
| 3,864,265 | 2/1975 | Markley | 210/321 |
| 3,909,418 | 9/1975 | Hunter et al. | 210/336 |
| 3,979,297 | 9/1976 | Bardin et al. | 210/232 |
| 4,009,107 | 2/1977 | Miller et al. | 210/321 |
| 4,009,108 | 2/1977 | Miller et al. | 210/321 |
| 4,019,988 | 4/1977 | Ziegler | 210/494 |
| 4,066,553 | 1/1978 | Bardonnet et al. | 210/321 |
| 4,128,479 | 12/1978 | Malchesky et al. | 210/321 |
| 4,163,721 | 8/1979 | Lobdell | 210/232 |
| 4,199,458 | 4/1980 | Nauman | 210/321 |
| 4,432,858 | 2/1984 | Schmitt et al. | 204/257 |
| 4,601,824 | 7/1986 | Dreyer | 210/232 |
| 4,650,574 | 3/1987 | Hilgendorff et al. | 210/180 |
| 4,761,229 | 8/1988 | Thompson et al. | 210/321.82 |
| 4,822,382 | 4/1989 | Nelson | 55/158 |

FOREIGN PATENT DOCUMENTS

| | | |
|---|---|---|
| 3028398 | 2/1982 | Fed. Rep. of Germany . |
| 3141388 | 6/1983 | Fed. Rep. of Germany . |
| 9035194 | 10/1979 | Japan . |
| 7415083 | 5/1976 | Netherlands . |
| 2001867 | 2/1979 | United Kingdom . |

OTHER PUBLICATIONS

"Membrane Technology", Kirk-Othmer Encyclopedia of Chemical Technology, 3rd ed, pp. 92-131.
"New Generation of Membranes Developed for Industrial Separations", J. Haggin, *Chemical & Engineering News*, Jun. 6, 1988, pp. 7-16.
"Ultrafiltration: An Emerging Unit-Operation", P. Klinkowski, *Chemical Engineering*, May 8, 1978, pp. 165-173.

*Primary Examiner*—Frank Sever
*Attorney, Agent, or Firm*—Joseph J. Allocca

[57] ABSTRACT

The present invention is a flat stack permeator useful under dialysis, ultrafiltration, reverse osmosis, perstraction, pervaporation, etc. conditions. The permeator comprises a multitude of membrane layer alternately separated by feed-retentate spacers and permeate spacers. The layers are secured along their edges so as to define separate feed-retentate zones and permeate zone. The edge gluing is performed so that in any given layer the two parallel edges are secured, while on the layers immediately above and below the edge pairs which are secured are 90° out of register with the previously mentioned pair of secured edges. In that way alternate feed retentate and permeate zones are defined which are perpendicular in flow one to the other. This stack of membrane and spacer layer is fabricated between flat rigid, solid, non-permeable sheets, the membrane sheets immediately adjacent to said solid sheets being edge glued to the sheet along the proper edge defining a feed-retentate or permeate zone as appropriate to form a module. This module is fitted with manifolds to provide a feed-retentate entrance-exit pair and separate permeate exits. Alternatively the module can be inserted into an appropriately manifolded pressure vessel.

12 Claims, 3 Drawing Sheets

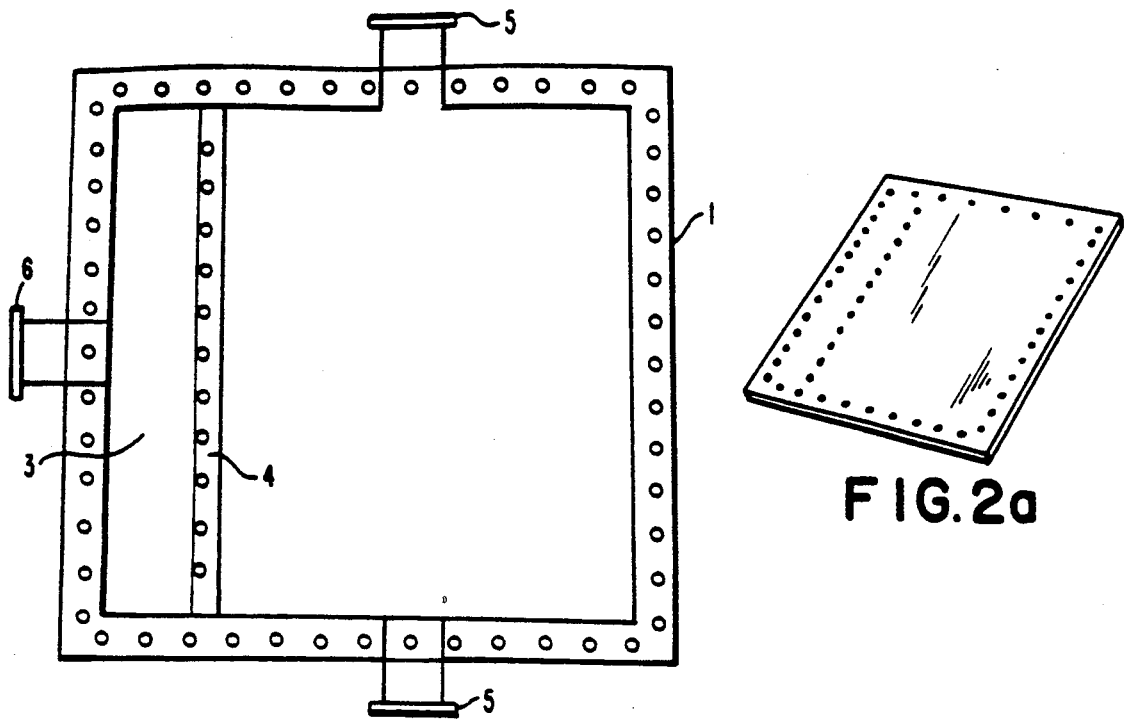
FIG. 2
FIG. 2a
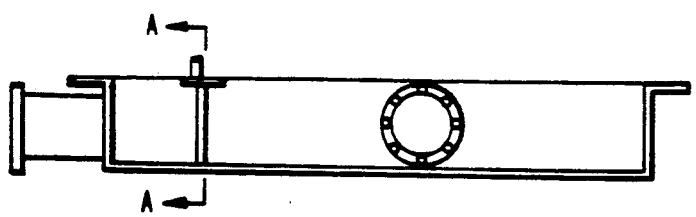
FIG. 3
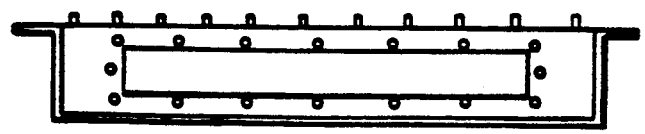
FIG. 4

FLAT STACK PERMEATOR

CROSS-REFERENCE TO RELATED APPLICATIONS

This is a continuation-in-part of U.S. Ser. No. 407,992, filed Sept. 15, 1989 based on PM# 88-SLP-011 now abandoned.

FIELD OF THE INVENTION

The present invention is a flat stack permeator made from flat sheets of membrane material, useful for separating compounds under dialysis, ultrafiltration, reverse osmosis, perstraction, pervaporation, etc. type separation mechanisms and at elevated temperatures and pressures. This membrane element design can also be used for the fabrication of membrane reactor elements, i.e., elements in which the membrane sheets contains reaction inducing or acceleration components such as catalysts.

DESCRIPTION OF THE FIGURE

FIG. 2 presents a pressure vessel into which a module can be placed,
FIG. 2a presents a view of the pressure vessel cover plate.
FIG. 3 presents different view of the pressure vessel.
FIG. 4 presents a view of the baffle plate.

BACKGROUND OF THE INVENTION

Figure 1:
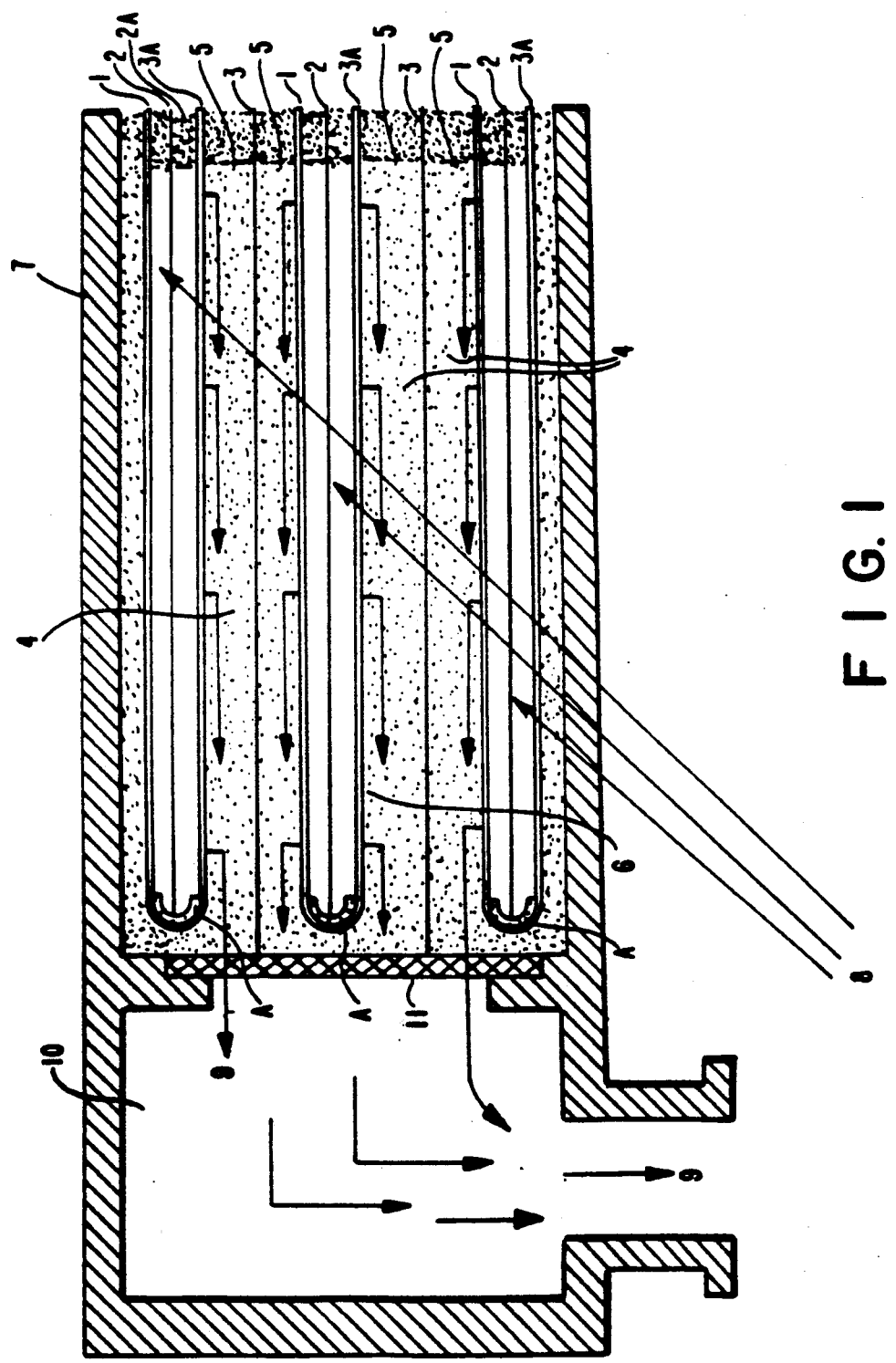
FIG. 1 presents a preferred embodiment of the flat stack permeator of the present invention.

Flat plate and frame membrane elements made-up of alternating sheets of membrane-permeate/product spacer-membrane-feed/retentate spacer-membrane, etc. are useful when the materials of construction which are used to fabricate the elements are stiff, not bendable or pliable or brittle, thus making fabrication of spiral wound elements extremely difficult if not impossible. However, traditional flat plate and frame membrane elements are usually characterized by the need to provide independent manifold means for each individual permeate zone and feed/retentate zone in the membrane stack. Even if such independent multiple manifold means are not required because of the ability to gang or group the numerous permeate zones and retentate zones and service each group by a single permeate manifold and feed/retentate manifold, the traditional flat plate and frame design usually employs long bolts to hold the entire assembly together and provide the compression needed to seal the permeate zones from the retentate zones. If bolts are not used the securing of the zones usually depends on mechanical clamping or other means for producing compression on the edges of the membrane envelopes to produce the seals necessary to result in the creation of permeate zones and feed/retentate zones. Over time and during use the bolts or the other mechanical clamping or compression inducing means tend to loosen due to compaction of the materials of construction of the membrane elements or physical, chemical or thermal deterioration of the materials. This results in a loss of compression on the element and compromise of element integrity permitting migration of feed into the permeate zone.

It would be an advantage if flat stack membrane elements could be produced which take advantage of the ability to employ stiff, brittle or unbendable materials in their construction, and which can use permeate and retentate manifolds servicing numerous ganged or grouped permeate and retentate zones in the stack but which do not rely on bolts, mechanical clamps or other compression inducing means to produce the seals between membrane sheets needed to produce fluid tight permeate zones and retentate zones in the elements. Such an element would exhibit integrity over long periods of use with minimal or no maintenance.

DESCRIPTION OF THE INVENTION

The permeator of the present invention comprises a multitude of membrane layers alternately separated by feed-retentate spacers and permeate/product spacers. The membrane layers are flat sheets secured by glue or adhesive or otherwise attached such as by heat induced melt welding or chemical welding using a dissolving solvent along their edges so as to define separate feed-retentate zones and a permeate/product zone. As used hereinafter in the specification and claims, the term "secured" is understood to mean the aforementioned techniques. The edge securing is performed so that for a given pair of membrane layers two parallel edges are secured, while for the membrane layers immediately above and below the aforesaid pair of membrane layers the edge pairs which are secured to the edges of the membrane layers of the aforesaid pair are 90° out of register with the previously mentioned pair of secured edges. In that way alternate-feed retentate and permeate zones are defined which are perpendicular in flow one to the other. As is seen, adhesive glue or chemical or heat melt welding secure the module together and insures the fluid integrity of each permeate zone and retentate zone in the membrane stack. During fabrication the element is held in a press or between clamps only for as long as is needed for the adhesives or glues to set and cure.

This stack of membrane sheets and spacer layers may be fabricated between flat, rigid or flexible, solid, permeable or non-permeable structural sheets, the membrane layers immediately adjacent to said solid sheets being secured using an adhesive along their entire face to the solid structural sheet or along the proper alternating edge thereby defining a feed-retentate or permeate/product zone, as appropriate, to form a module.

This module can be fitted with multiple manifolds serving the groups of permeate/product zones and retentate zones to provide a feed-retentate entrance-exit pair and separate permeate exit. Alternatively the module can be inserted into an appropriately manifolded pressure vessel. The pressure vessel can be held together by bolts, or other mechanical means, but these bolts are not primarily responsible for the integrity of the membrane module wherein adhesives secure the membrane edges rather than relying on mechanical clamping. The bolts or mechanical clamping elements are used to hold the housing elements together.

The flat stack permeator of the present invention can employ sheets of membrane made from any polymeric material or non-polymeric material such as ceramic. Thus even membranes which are extremely thin or fragile or stiff can be used because the membrane materials need not be bent in fabricating the module. Similarly, feed-retentate spacer materials and permeate/product spacer materials need not be pliable but can themselves be stiff, because, they too, need not be bent in fabricating the modules. Because the membrane need not be pliable the membrane used in fabricating the flat stack permeators are not necessarily polymeric materials but can even be ceramic, glass, carbon fiber or sintered metal sheets which would allow the permeator of the present invention to be used under extremely high temperatures, the upper limit being set only by the maximum temperature to which the glues or adhesives used in effecting the seals can be exposed. Furthermore, because there is no limitation on the nature of the membrane layer, the module can be employed as a membrane reactor wherein the membrane includes reaction inducing or accelerating agents such as catalyst so that feed enters one face of the membrane, reacts due to contact with or upon passage through the membrane and exits the opposite membrane face as a product-/permeate which is subsequently recovered. Feed-retentate spacers and permeate spacers made of wire or corrugated metal sheets or rods can be used as can be heat and solvent resistant plastic weaves, rods or corrugated sheets. Further, because the spacer material will not be bent or folded or wrapped it can be thicker than usually employed in fabricating spiral wound elements. The feed-retentate and permeate spacer sheets can be the same size as the flat membrane sheets extending into the glue/adhesive area, discussed below, used to fabricate the module.

The flat, rigid, solid, non-permeable sheets between which the membrane-spacer stack is fabricated can also be selected from a broad range of materials depending on the service in which the permeator will be used. Thus the sheets can be selected from metal (i.e. aluminum, brass, steel etc.) plastic, fiberglass reinforced epoxy sheets, glass composite sheets, impermeable graphite sheets etc. The selection of material will, of course, depend on the liquids and/or gases, as well as the temperatures and pressures to which the unit will be exposed during use.

The adhesives used in fabricating the flat stack permeator are selected from those which are resistant to the liquid or gas environment to which they will be exposed as well as resistant to the temperatures and pressures of operation. The adhesives must also be capable of forming bonds/seals between different materials, e.g. between layers of membranes, between membranes and spacer materials, between membranes and flat, rigid solid non-permeable sheets making up the module housing. These adhesives will generally be commercially available adhesives. Occasionally it will be necessary to prime the surfaces to be glued to achieve adequate seals, in accordance with manufacturer instructions. Adhesives which have been found useful in forming edge seals in spiral wound membrane modules for use in dewaxing solvent environments are epoxies disclosed in U.S. Pat. No. 4,464,494 while adhesives which are useful in forming edge seals in spiral wound membrane modules for use in aromatic extraction solvent environments are silicons disclosed in U.S. Pat. No. 4,582,726, the disclosures of both of which are incorporated herein by reference.

The flat stack permeator may contain any number of membrane layers alternately separated by feed-retentate spacers and permeate spacers, but at least one pair of feed-retentate/permeate zones is needed. The upper limit on the number of such zones is set merely by handling consideration of the practitioner. Length and width dimensions are similarly set by the hydrodynamics of the system. The length of the permeate leaf (zone) is limited by the viscosity of the permeate and the permeation rate which create a given pressure drop. An acceptable level is set by the leaf thickness. Similarly, for the feed-retentate zone, the leaf thickness and length for a given feed viscosity and flow rate are limited by the acceptable pressure drop. The flat stack permeation can be square or rectangular. When rectangular in shape the choice of which dimension corresponds to the feed-retentate zone or permeate zone is again within the discretion of the practitioner.

Following fabrication, the module can be trimmed along its edges to produce flush, square and perpendicular faces.

The flat, rigid, solid sheets which are present on opposite faces of the module and define the module can, if desired, have edges along all four sides which bear flanges to which can be attached the manifolding means servicing the groups of permeate zones and retentate zones in the element stack and defining feed-retentate entrance and exit means and permeate exit means. In this way, if the flat, rigid sheets are strong enough for the intended service the module is, per se, the entire separation apparatus.

If the module is to be used under extremes of temperature, pressure or in other aggressive environments, or if the flat sheets defining the body of the module are flexible or are themselves permeable the module (preferably after being trimmed to produce flush, perpendicular faces) can be inserted into a pressure vessel corresponding in shape to that of the module. This housing has manifolding means defining a feed-retentate entrance-exit pair and permeate exit means which is perpendicular to the aforesaid feed-retentate entrance-exit pair. The pressure vessel is held together using bolts or other mechanical means. These bolts or mechanical means are not employed to compress the membrane stack but simply to hold the housing together.

As an alternative to the previous description, the flat stack permeators can use sheets of membrane materials which can be folded. When using foldable sheets, the sheets of membrane are folded around the spacer material to form a leaf and layers of the complimentary spacer material are placed between pairs of membrane leaves. The three membrane edges in adjacent membrane leaves two of which are 90° out of register with and the other opposite to the membrane edge fold of the leaves are secured with adhesive or glue while the membrane edges in each individual leaf which are parallel to the fold are similarly secured by adhesive or glue to thereby define feed-retentate zones and permeate zones, the flows in which zones will be perpendicular.

In order to insure the structural integrity of the membrane at the fold line (i.e. to reduce the possibility of membrane blow-out or rupture) precautions should be taken to insure that the membrane stack package at the side of the module in which the fold is located is not loose. Additional compaction along that edge of the package results in a module which is sufficiently tight to prevent blow outs. This can be accomplished any number of ways. Extra material such as additional strips of membrane material or spacer material can be laid at the fold so that upon clamping and compaction during construction a tight package is produced. The reinforcing strip adds to the thickness dimension of the package, but only at the fold position. Hence, when the package is manufactured and placed into a clamp or press during construction to obtain equal channel height throughout the package, the existence of the reinforcing strip results in extra compression at this critical fold point and prevents rupture at the fold. Alternatively and in a preferred embodiment using folded membrane sheets, the fold edge is itself reinforced to prevent blow out of the membrane (if used under pressure) along the folded edge. The reinforcing is accomplished by use of a strip of material, such as teflon, positioned at the inside of the fold and optionally along the outside of the fold. Preferably the reinforcing strip is an underlayer on the inside fold edge of the membrane. This narrow strip of material can be positioned along the fold edge and held in place either by friction i.e. just placed in position and held there by the dynamic pressure of being in contact with the e.g. feed/retentate spacer if placed along the inside fold edge and/or the e.g. permeate spacer if placed along the outside fold edge, or by use of an adhesive. The adhesive can be a permanent, solvent resistant adhesive or it can be one which is used just to position the strip during fabrication but which dissolves during use of the module, the strip then being held in place simply by the nature of its location and position. The reinforcing material is typical 0.003 inches thick, but may be thinner if very strong materials are used or thicker if more reinforcing strength is necessary, and is selected from teflon, nylon, polyethylene or other plastics which are stable in the system, preferably teflon. The reinforcing step can even be just a strip of glue or adhesive, preferably a flexible glue or adhesive on the inside surface of the membrane at the fold line. An adhesive which is useful for reinforcing membrane fold lines in modules used for the separation of aromatics from non-aromatics in heavy cat naphtha feeds is Trabond 2125, a Novalac Resin with epoxy hardeners modified with Butyl benzyl phthalate (10%-20%) as a flexibilizer. The reinforcing strip extends the entire length of the fold but is only wide enough to extend a short distance on either side of the fold line. As a further option a sheet of permeate spacer can be wrapped around the folded membrane edge in place of or in addition to the usual sheet of permeate spacer material.

Again the stack is fabricated between flat, solid, rigid or flexible, permeable or non-permeable structural sheets of material secured by adhesive or glue to the faces of the membrane layer immediately adjacent to such flat, solid, rigid or flexible, permeable or non-permeable structural sheets to form a module and this module can be manifolded as such to form a separation apparatus or inserted into an appropriately manifolded pressured vessel as previously described. When such a folded membrane is employed trimming is practiced to "true-up" the module to produce flush, perpendicular faces on all four sides, care being taken during trimming to prevent damage to the three outer edge glue lines and also so that the internal membrane fold is not cut and remains intact.

If a separate pressure vessel is needed, the flat stack of membrane leaves must be prepared for insertion into the vessel housing. Metal "L" shaped flanges are affixed to the stack of membrane leaves between the structural sheets. The metal flanges are affixed along the edge corresponding to the membrane fold lines. Alternatively the structural sheets have integral flanges. In such a case when the membrane stack employs folded membrane sheets the membrane stack is fabricated so that when the membrane stack is placed between the two structure sheets the membrane fold edge is just inside the plane of the flange faces. The flange permits the module to be secured into the vessel housing and isolates the permeate zones from the feed/retentate zones. Metal (i.e. aluminum or other compatible metal) blocks equal in height to the stack are glued to the stack along the edges perpendicular to the edge at which the membrane is folded, or, if no folded membrane is used, the permeate exit edge, the blocks being short in length and located close to the edge at which the membrane is folded, or, if no folded membrane is used, the permeate exit edge, to insure that no feed or retentate can leak past the edges into the permeate zone. Holes both in the flanges and metal blocks align with the bolt holes in the face of the baffle plate of the housing vessel so that the membrane stack can be secured into the housing vessel.

Prior to the hardening of the adhesive (but subsequent to the membrane stack trimming step) the membrane stack and attached short metal blocks are placed between the structural sheets of material used to define the module. The structural sheets extend beyond the edges of the membrane stack along the feed/retentate edges of the stack but the sides of the structural sheets corresponding to the permeate edge of the stack are flush with that edge. The structural sheets are clamped or bolted to compact the membrane stack prior to the glue finally curing and hardening. The integrity of the membrane element is achieved using the adhesive and glue rather than the bolts. While the bolts are not responsible for maintaining the seal between membrane edges to define permeate zones and retentate zones, the compaction caused by using bolts helps prevent blow out of the membrane fold and telescoping of the package due to high feed flow rates. The presence of the bolts will also help to physically prevent telescoping. A sheet of gasket material such as Klingerite or a bead of gasket material is placed between the faces of the flanges and the baffle plate of the housing vessel to create a seal.

The FIG. 1 presents one embodiment of the apparatus. The figure shows a three membrane leaf module in cross section along one of the edges. The membrane sheet (1) is folded around the feed-retentate spacer (2). The ends of the folded membrane sheet opposite the fold line are secured (e.g. glued) (2A) along its entire length to thereby define a closed area. The membrane sheet has a reinforcing strip of material (A) at the inside of the fold, the leaves are separated by the permeate spacers (3). An optional sheet of permeate spacer material (3A) can be over-wrapped around the folded membrane. The permeate zone (4) is defined by applying glue (5) along the edges (6) of the membranes in adjacent leaves along the three edges which are (I) 90° out of register with and (II) opposite to the membrane edge fold. The three leaves are sandwiched between flat, rigid, solid sheets of material (7) to form a stack module in which feed-retentate flow (8) is perpendicular to permeate flow (9). The figure shows the module housing as containing integral permeate manifolding means (10) separated from the stack by a baffle plate and screen (11). Alternatively stack modules without integral permanent manifolding can be inserted into a pressure vessel as shown in FIG. 2. This vessel comprises a receptacle (1) into which the module is placed, then a cover plate FIG. (2a) is secured to close the vessel. The stack module does not completely fill the receptacle but leaves an open zone (3) defined by a baffle plate or screen (4) which creates a manifold for collecting permeate from the individual permeate zones to a permeate exit means. The stack module fits snugly between the feed-retentate entrance/exit means (5) and keeps the feed-retentate separate from the permeate and permeate exit means (6). FIGS. 3 and 4 present another view of housing 1 and shows the placement of the baffle (3) as well as the profile of the baffle (FIG. 4).

Figure 5:
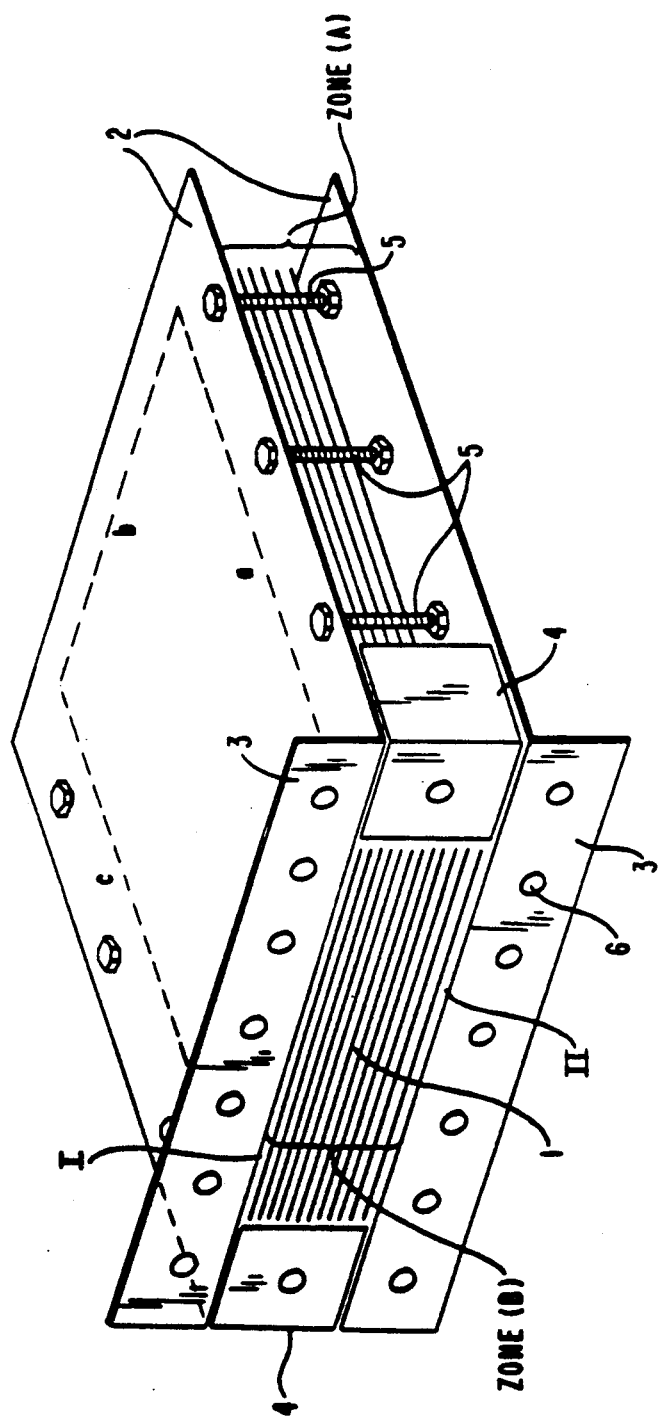
FIG. 5 presents a schematic of the flat stack module.

FIG. 5 presents a schematic of a flat stack module. The stack (1) of membrane leaves, permeate spacers and retentate spacers, appropriately glued along the proper edges (as previously described) is trimmed along all four edges to produce flush perpendicular and squared faces. Two short blocks (4) equal in height to the membrane stack are glued to the stack of membranes along a short length of edges a and c and flush with the permeate edge of the stack (zone B) and have glue applied to the faces corresponding to the interior faces of the sheets of structural material. The stack (1) is placed between two sheets of structural material (2) which have flanges (3) either attached thereto or as an integral part of the sheet. The membrane stack (1) is glued along 3 edges (a–c) on both the upper and lower sides (I and II) to the sheets of structural material (2) which sheets extend beyond the membrane stack (1) along the feed/retentate edges (edges a and c).

Following the application of glue along the aforesaid edges of the membrane stack and faces of the blocks and the insertion of said stack and blocks between the structural sheets, the sheets of structural material are bolted together using bolts (5) before the glue dries to effect the compaction of the membrane stack and create flush tight seals between the feed/retentate zone (A) and the permeate zone (B).

The module is then inserted into the housing vessel (see FIGS. 2, 3 and 4). The module face defined by the flanges and blocks has a gasket sheet or bead of gasket material applied to it and then is mated to the baffle plate (FIG. 4) using bolts inserted through bolt holes (6 present in the flanges and corresponding bolt holes in the baffle plate (FIG. 4). Once the module is inserted into the housing and bolted into place the cover plate (FIG. 2a) is attached to the top of the vessel housing (FIG. 2).

EXAMPLE

A flat stack module was prepared using polyurea-/urethane membranes on Teflon support. The membrane is cast by using a polymer made from a 70/30 blend of 500/2000 MW polyethylene adipate end-capped with 4,4' diisocyanate-diphenyl methane and chain extended using 4,4' diamino diphenylmethane. A suspension of this polymer in DMF is coated onto a sheet of porous Teflon using the technique disclosed and claimed in U.S. Pat. No. 4,861,628. The Polyurea-/urethane membrane is itself described in U.S. Pat. No. 4,914,064. Sheets of membrane material were separated by alternating layers of feed/retentate spacer material, Tetco 1400 and permeate spacer material, also Tetco 1400. Tetco 1400 is a polyester woven monofilament mesh. It has a thickness of 28.5 mils with 14 strands per inch mesh count. It gives low pressure drop for the feed viscosities and flow rates used. The membrane on Teflon was further supported using a polyester trecot identified as Trecot 9628. The adhesive used for fabrication was a Novalac Resin with epoxy hardners modified with butyl benzyl phthalate (10%–20%) as a flexibilizer, identified as Trabond 2125. All metal elements were constructed of aluminum. The aluminum had to be prepped before application of the adhesive by the steps of degreasing the aluminum surface with a solvent (in this case Naphtha 1520), roughing the aluminum surface with emery cloth although sand blasting would also work, coating the roughened surface with a thin layer of a primer, in this case B. F. Goodrich Primer A937BY, a silane compound. Membrane fold reinforcing material was 0.03 inch Teflon sheet. This module was successfully tested for one month at 140° C. in a pervaporation mode for the separation of aromatics from non-aromatics on heavy cat naphtha feed.

What is claimed is:

1. A flat stack permeator module comprising means for providing an alternative to mechanical compression means while at least enabling use of stiff, brittle or unbendable materials of construction, including a multitude of membrane layers alternately separated by feed-retentate spacer material and permeate spacer material to define a stack wherein the membrane layers are secured along their edges so as to define separate feed-retentate zones and permeate zones, the edge securing being performed so that for any pair of membrane layers the two parallel edges are secured while for the membrane layers immediately above and below the aforesaid pair of membrane layers, the edges which are secured to the edges of the membrane layers of the aforesaid pair are 90° out of register with the previously identified pair of secured edges, thereby defining alternate feed retentate and permeate zones which are perpendicular in flow to each other, the stack being assembled between sheets of material defining the body of the module to which the membrane layers adjacent to the sheets of material are secured.

2. The module of claim 1 wherein the membrane layers are folded around a spacer material to form a leaf with layers of the complementary spacer material placed between pairs of membrane leaves, in which the three membrane edges in adjacent membrane leaves two of which are 90° out of register with, and one of which is opposite the membrane edge fold of the leaf are secured to define feed-retentate zone and permeator zones.

3. The module of claim 2 wherein the folded edge of the membrane is reinforced using a strip of reinforcing material located at the interior face of the membrane along the fold line.

4. The module of claim 2 wherein the folded edge of the membrane is reinforced using a strip of adhesive located along the fold line.

5. The module of claim 2 wherein the folded edge of the membrane is reinforced using a strip of reinforcing material located at the outer face of the membrane along the fold line.

6. The module of claim 2 wherein the folded edge of the membrane is reinforced using a pair of strips of reinforcing material located at both the interior face and outer face of the membrane along the fold line.

7. The module of claim 3, 4, 5 or 6 wherein the reinforcing material is teflon.

8. The module of claim 3, 4, 5 or 6 wherein an extra sheet of permeate spacer material is over wrapped around the folded membrane.

9. The module of claim 1 wherein the sheet material defining the module is solid, rigid and non-permeable and the edges of which bear flanges to which are attached manifolding means defining feed retentate entrance and exit means and permeator means.

10. The module of claim 1 wherein the sheet material defining the module is solid, flexible and permeable and the module is inserted into a pressure vessel equipped with the manifolding means defining feed-retentate entrance-exit means and permeator exit means.

11. The module of claim 1 or 2 wherein the membrane edges are secured by glue or adhesive.

12. The module of claim 1 or 2 wherein the membrane edges are secured by heat induced melt welding.

* * * * *